US008260591B2

(12) United States Patent
Kass et al.

(10) Patent No.: US 8,260,591 B2
(45) Date of Patent: Sep. 4, 2012

(54) DYNAMICALLY SPECIFYING A VIEW

(75) Inventors: Samuel J. Kass, Santa Clara, CA (US);
Bradley A. Davis, Santa Clara, CA (US);
Anil Kumar V. Chillarige, Milpitas, CA (US); Malia Smith, Mountain View, CA (US)

(73) Assignee: Align Technology, Inc., San Jose, CA (US)

( * ) Notice: Subject to any disclaimer, the term of this patent is extended or adjusted under 35 U.S.C. 154(b) by 398 days.

(21) Appl. No.: 10/836,757

(22) Filed: Apr. 29, 2004

(65) Prior Publication Data

US 2005/0246154 A1 Nov. 3, 2005

(51) Int. Cl.
*G06G 7/48* (2006.01)
*G06G 7/60* (2006.01)
*G06F 19/00* (2011.01)
*G06F 19/12* (2011.01)

(52) U.S. Cl. ............................................. 703/6; 700/105
(58) Field of Classification Search .................. 700/105; 703/6
See application file for complete search history.

(56) References Cited

U.S. PATENT DOCUMENTS

| | | | |
|---|---|---|---|
| 3,660,900 A | 5/1972 | Andrews | |
| 3,860,803 A | 1/1975 | Levine | |
| 4,755,139 A | 7/1988 | Abbatte et al. | |
| 4,798,534 A | 1/1989 | Breads | |
| 4,856,991 A | 8/1989 | Breads et al. | |
| 4,936,862 A | 6/1990 | Walker et al. | |
| 5,011,405 A | 4/1991 | Lemchen | |
| 5,035,613 A | 7/1991 | Breads et al. | |
| 5,055,039 A | 10/1991 | Abbatte et al. | |
| 5,059,118 A | 10/1991 | Breads et al. | |
| 5,139,419 A | 8/1992 | Andreiko et al. | |
| 5,186,623 A | 2/1993 | Breads et al. | |
| 5,273,429 A | 12/1993 | Rekow et al. | |
| 5,338,198 A | 8/1994 | Wu et al. | |
| 5,340,309 A | 8/1994 | Robertson | |
| 5,342,202 A | 8/1994 | Deshayes | |
| 5,533,895 A | 8/1994 | Fujan et al. | |
| 5,368,478 A | 11/1994 | Andreiko et al. | |
| 5,382,164 A | 1/1995 | Stern | |
| 5,395,238 A | 3/1995 | Andreiko et al. | |
| 5,431,562 A | 7/1995 | Andreiko et al. | |
| 5,447,432 A | 9/1995 | Andreiko et al. | |
| 5,452,219 A | 9/1995 | Dehoff et al. | |
| 5,454,717 A | 10/1995 | Andreiko et al. | |
| 5,458,125 A * | 10/1995 | Schweikard | .................. 600/407 |
| 5,474,448 A | 12/1995 | Andreiko et al. | |

(Continued)

FOREIGN PATENT DOCUMENTS

KR 2001-4136 A 1/2001

(Continued)

OTHER PUBLICATIONS

Korean Official Action issued on Jul. 26, 2005, for Korean Patent Application No. 2003-72424. (listing 2 references).

*Primary Examiner* — Suzanne Lo
(74) *Attorney, Agent, or Firm* — Brooks, Cameron & Huebsch, PLLC

(57) ABSTRACT

Systems and methods to provide a UI includes providing a program with a dynamic content to specify a view; and rendering the view based on the dynamic content.

21 Claims, 8 Drawing Sheets

U.S. PATENT DOCUMENTS

| | | | |
|---|---|---|---|
| 5,528,735 A | 6/1996 | Strasnick et al. | |
| 5,549,476 A | 8/1996 | Stern | |
| 5,587,912 A | 12/1996 | Andersson et al. | |
| 5,605,459 A | 2/1997 | Kuroda et al. | |
| 5,607,305 A | 3/1997 | Andersson et al. | |
| 5,645,421 A | 7/1997 | Slootsky | |
| 6,227,850 B1* | 5/2001 | Chishti et al. | 433/24 |
| 6,343,328 B1 | 1/2002 | Murphy et al. | |
| 6,413,086 B1 | 7/2002 | Womack | |
| 6,510,199 B1* | 1/2003 | Hughes et al. | 378/65 |
| 6,575,751 B1* | 6/2003 | Lehmann et al. | 433/223 |
| 6,632,089 B2 | 10/2003 | Rubbert et al. | |
| 6,648,640 B2 | 11/2003 | Rubbert et al. | |
| 6,701,174 B1* | 3/2004 | Krause et al. | 600/407 |
| 6,786,726 B2* | 9/2004 | Lehmann et al. | 433/223 |
| 6,875,020 B2* | 4/2005 | Niddrie et al. | 434/236 |
| 7,388,972 B2* | 6/2008 | Kitson | 382/128 |
| 2001/0002310 A1* | 5/2001 | Chishti et al. | 433/24 |
| 2002/0010568 A1* | 1/2002 | Rubbert et al. | 703/6 |
| 2002/0025503 A1* | 2/2002 | Chapoulaud et al. | 433/24 |
| 2002/0028417 A1 | 3/2002 | Chapoulaud et al. | |
| 2002/0172911 A1* | 11/2002 | Cooper | 433/24 |
| 2002/0188478 A1* | 12/2002 | Breeland et al. | 705/3 |
| 2003/0118222 A1* | 6/2003 | Foran et al. | 382/128 |
| 2003/0174155 A1 | 9/2003 | Weng et al. | |
| 2003/0214501 A1* | 11/2003 | Hultgren et al. | 345/419 |
| 2004/0015070 A1* | 1/2004 | Liang et al. | 600/407 |
| 2004/0197727 A1* | 10/2004 | Sachdeva et al. | 433/24 |
| 2005/0182654 A1* | 8/2005 | Abolfathi et al. | 705/2 |
| 2005/0182659 A1* | 8/2005 | Huttin | 705/2 |
| 2006/0275736 A1* | 12/2006 | Wen et al. | 433/213 |

FOREIGN PATENT DOCUMENTS

| | | |
|---|---|---|
| KR | 2003-50912 A | 6/2003 |

\* cited by examiner

DYNAMICALLY SPECIFYING A VIEW

BACKGROUND

The invention relates generally to the field of orthodontics and, more particularly, to computer-automated development of an orthodontic treatment plan and appliance.

Orthodontics is the branch of dentistry that deals with the straightening of crooked teeth. Although there are many types of appliances that can be used by an orthodontist to straighten the teeth, the most common appliance is braces. Braces include a variety of appliances such as brackets, archwires, ligatures, and O-rings, and attaching braces to a patient's teeth is a tedious and time consuming enterprise requiring many meetings with the treating orthodontist. Consequently, conventional orthodontic treatment limits an orthodontist's patient capacity and makes orthodontic treatment quite expensive.

Before fastening braces to a patient's teeth, at least one appointment is typically scheduled with the orthodontist, dentist, and/or X-ray laboratory so that X-rays and photographs of the patient's teeth and jaw structure can be taken. Also during this preliminary meeting, or possibly at a later meeting, an alginate mold of the patient's teeth is typically made. This mold provides a model of the patient's teeth that the orthodontist uses in conjunction with the X-rays and photographs to formulate a treatment strategy. The orthodontist then typically schedules one or more appointments during which braces will be attached to the patient's teeth.

The formulation of the treatment strategy is typically a trial-and-error process where the orthodontist arrives at the treatment strategy using a mental model based on the orthodontist's experience and skill. Because an exact model is not available, the formulation of the treatment strategy is an art which is highly dependent on the estimates and judgments of the treating orthodontist or a dental appliance fabricator on behalf of the treating orthodontist. Once the treatment strategy has been generated, it is difficult to communicate the treatment plan and the expected result between the orthodontist and the dental appliance fabricator.

SUMMARY

In one aspect, systems and methods to provide a UI includes providing a program with a dynamic content to specify a view; and rendering the view based on the dynamic content.

Advantages of the above system may include one or more of the following. A combination of mark-up language (such as HTML) forms and control tags affect how information is presented. Since the mark-up language forms and tags are can be modified on the fly without shipping a new version of the program, a new form can be published quickly and conveniently. The close integration of the program and the mark-up language elements allows the review UI to be modified at any point in time without re-releasing the program.

Advantages of the invention include one or more of the following. Visualization is used to communicate treatment information in a computer-automated orthodontic treatment plan and appliance. The invention generates a realistic model of the patient's teeth without requiring a user to possess in-depth knowledge of parameters associated with a patient dental data capture system. Additionally, expertise in 3D software and knowledge of computer architecture is no longer needed to process and translate the captured medical data into a realistic computer model rendering and animation.

The invention thus allows treatment visualization to be generated in a simple and efficient manner. It also improves the way a treating clinician performs case presentations by allowing the clinician to express his or her treatment plans more clearly. Another benefit is the ability to visualize and interact with models and processes reducing the attendant danger, impracticality, or significantly greater expense that may be encountered in the same environment if it were an unstructured review of the treatment plan. Thus, money and time are saved while the quality of the treatment plan is enhanced.

DESCRIPTION

Figure 1A:
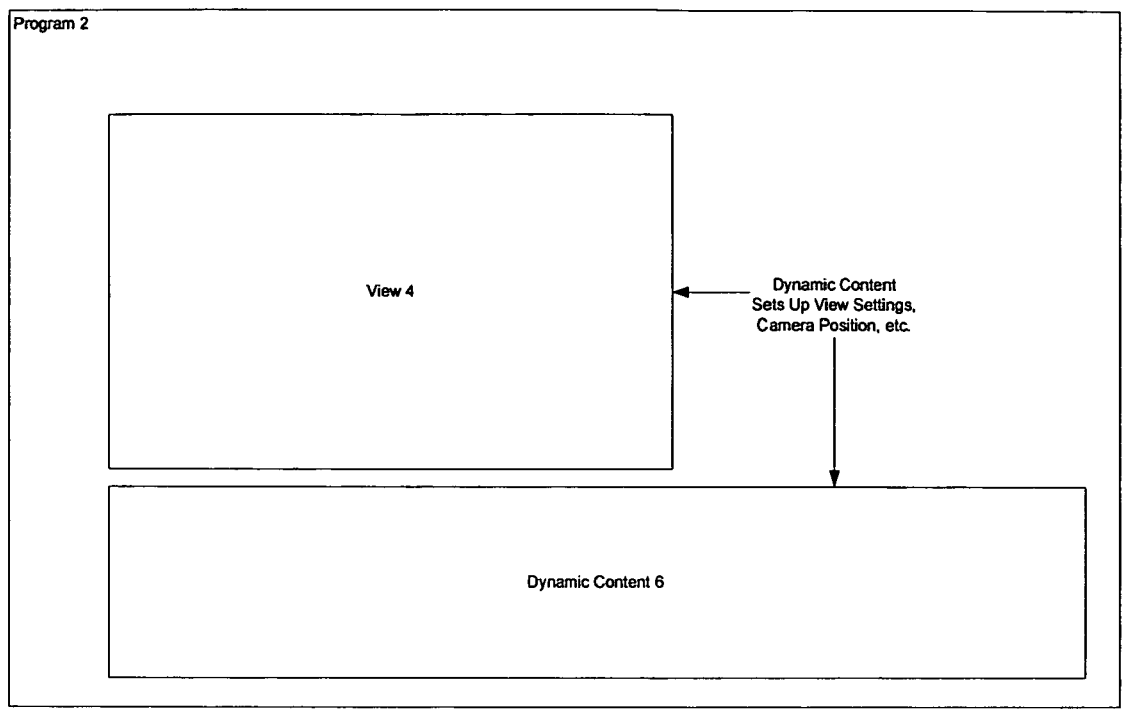
FIG. 1A shows an exemplary user interface with dynamic specification of a view.

Referring now to FIG. 1A, an exemplary user interface is shown. In the UI of FIG. 1A, a program 2 provides a view window 4. The program 2 also provides a dynamic content region 6. The output of the dynamic content region 6 is provided to the program 2 and influences the display of the view window 4.

The program 2 includes an animation routine that provides a series of images showing the positions of the teeth at each intermediate step along a treatment path. A user such as a clinician controls the animation routine through a VCR metaphor, which provides control buttons similar to those on a conventional video cassette recorder. In particular, the VCR metaphor includes a "play" button that, when selected, causes the animation routine to step through all of the images along the treatment path. A slide bar can be used to request movement by a predetermined distance with each successive image displayed. The VCR metaphor also includes a "step forward" button and a "step back" button, which allow the clinician to step forward or backward through the series of images, one key frame or treatment step at a time, as well as a "fast forward" button and a "fast back" button, which allow the clinician to jump immediately to the final image or initial image, respectively. The clinician also can step immediately to any image in the series by typing in the stage number.

As described in commonly owned U.S. Pat. No. 6,227,850, the content of which is incorporated by reference, the viewer program receives a fixed subset of key positions, including an initial data set and a final data set, from the remote host. From this data, the animation routine derives the transformation curves required to display the teeth at the intermediate treatment steps, using any of a variety of mathematical techniques. One technique is by invoking the path-generation program described above. In this situation, the viewer program includes the path-generation program code. The animation routine invokes this code either when the downloaded key positions are first received or when the user invokes the animation routine.

The program 2 displays an initial image of the teeth and, if requested by the clinician, a final image of the teeth as they will appear after treatment. The clinician can rotate the images in three dimensions to view the various tooth surfaces, and the clinician can snap the image to any of several pre-defined viewing angles. These viewing angles include the standard front, back, top, bottom and side views, as well as orthodontic-specific viewing angles, such as the lingual, buccal, facial, occlusal, and incisal views. The viewer program allows the clinician to alter the rendered image by manipulating the image graphically. The clinician also can provide textual feedback to the remote host through a dialog box in the interface display. Text entered into the dialog box is stored as a text object and later uploaded to the remote host or, alternatively, is delivered to the remote host immediately via an existing connection.

Figure 1B:
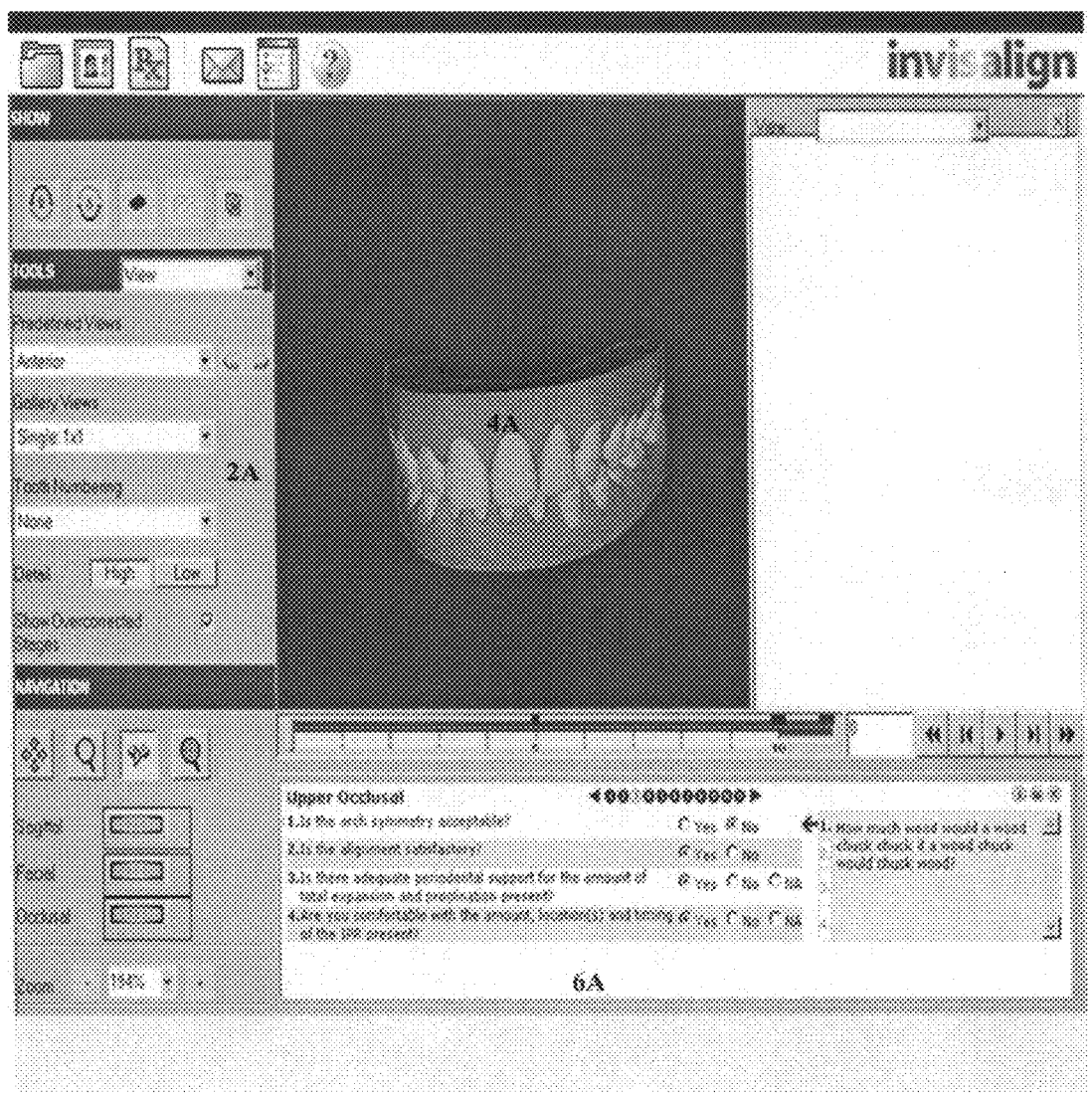
FIG. 1B shows another exemplary user interface that provides dynamic specification of a view, in this case a dental view.

In one embodiment shown in FIG. 1B, the program 2A is an orthodontic treatment program known as ClinCheck®, available from the dental appliance fabrication company Align Technology, Inc. of Santa Clara, Calif. In this embodiment, a series of dynamic pages collectively called a Review Wizard 6A specified in HTML are integrated in a display area of ClinCheck®. The Review Wizard 6A leads the user through a review of an orthodontic treatment, causing the 3D model shown in a window 4A and settings to be updated appropriately for each page of questions. The updating of the settings and the 3D model are done through a series of commands embedded in the HTML as an HTML comment. They are ignored by a typical HTML renderer, but are obeyed by ClinCheck® program to aid in the review of an orthodontic treatment.

A user such as a clinician or doctor is led through a series of yes/no questions that ask them to make certain observations concerning the case. While entering comments, each time the doctor moves to the next page, or clicks the "Save Draft" button, the server is updated with the draft comments. If the doctor leaves and returns later, on the same or another machine, the ClinCheck® program 2A is in the last state that the doctor was in prior to his or her last use.

For each question, a "No" response must be explained by a textual description. A doctor cannot continue to the next page unless every question is answered. If the doctor finds that each aspect of the case meets his or her satisfaction, the case is submitted for manufacturing. If the doctor is dissatisfied with any aspect of the case, the doctor is prompted to enter a comment about that aspect, and at the end of the review wizard the change requests are submitted back to the dental company for refinement.

Figure 2:
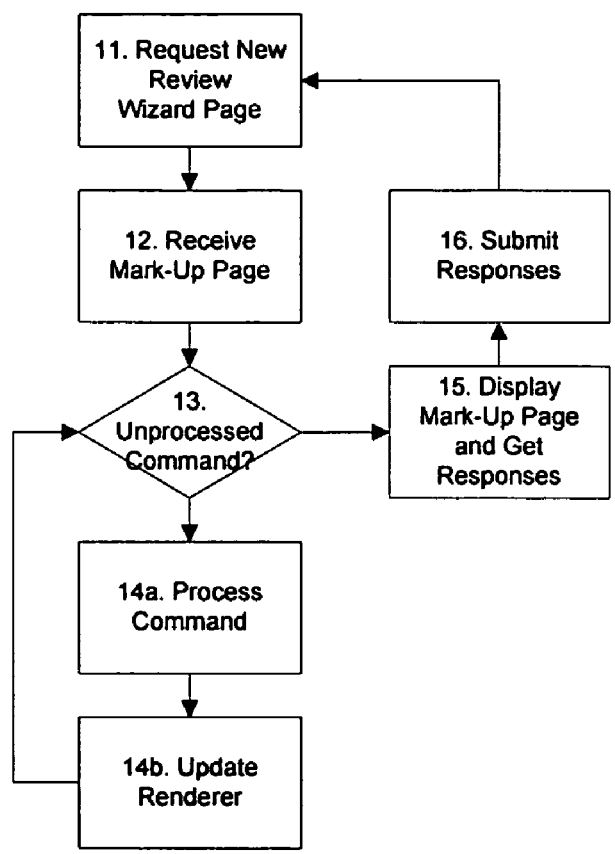
FIG. 2 shows an exemplary process for supporting interactions among a program, a dynamic content to specify a view; and a server in rendering the view based on the dynamic content.

Turning now to FIG. 2, an exemplary process for interactions among a program, a dynamic content to specify a view; and a server in rendering the view based on the dynamic content is shown. In this example, a program such as ClinCheck® requests a new Review Wizard page 6A (11) from a server (not shown). The requested page is provided (12). Next, the process checks whether any unprocessed commands remain (13). If so, the command is processed (14A) and a render or render engine is updated (14B). This is done until all commands have been processed. From 13, once all commands have been processed, the mark-up page is displayed and user responses are captured (15). The responses are sent to the server for storage, and the process waits another request for a review wizard page (11).

The commands that can be directed to the ClinCheck program are as follows:

CameraPosition Fx Fy Fz Tx Ty Tz Ux Uy Uz: This sets the camera's position, point that it's looking at, and which direction is up.

CameraViewpoint Name: Change the camera position to a named viewpoint.

GridVisible on/off: Turn the grid on or off.

GridPosition Px Py Pz Fx Fy Fz: Move the grid to P(x,y,z), with the "flat" side facing F(x,y,z).

OverCorrectionVisible on/off: Turn overcorrection stages on or off.

AttachmentsVisible on/off: Turn attachments on or off.

IPRVisible on/off: Turn on or off IPR information.

SetResolution high/low: Set the display resolution to high or low.

JawUpperVisible on/off: Turn on or off upper jaw visibility.

JawLowerVisible on/off: Turn on or off lower jaw visibility.

ZoomLevel percent: Set zoom level to percent %.

Stage stage: Set the case's stage to stage. Stage can either be an integer, or the string "first", "last", or "lastnooc", which sets it to the first stage, the last stage, or the last stage without overcorrection.

PrintScreen: Brings up a print dialog that, when accepted, prints the 3D image displayed.

SaveScreen: Brings up a save dialog that, when accepted, saves the 3D image as a JFIF (JPEG) file.

StateChanged: Is present if state has changed.

RefreshComments: Is present if comments have changed.

CloseClinCheck: Commands ClinCheck to close itself and release all resources.

ControlAttribute controlid attribute: Allows the review wizard to enable/disable/set/activate a UI control's value or function.

In one embodiment, the Review Wizard content is displayed in an enhanced browser control that supports a set of embedded commands to perform certain operations within ClinCheck program. These embedded commands will allow the Review Wizard to control features such as the Viewpoint display, the camera position, the grid, etc. All embedded commands in a pane are executed when the pane is displayed. Commands will be performed in the order on which they occur in the pane. One embodiment of the Review Wizard 6A has 12 panes:

1. Introduction/Information
2. Anterior View
3. Anterior Overjet View
4. Upper Occlusal View
5. Lower Occlusal View
6. Left Buccal View
7. Right Buccal View
8. Posterior (Lingual) View
9. Staging
10. Attachments
11. Other (if Applicable)
12. Finish Each pane allows the user to perform a set of actions and/or enter a set of comments that pertain to the pane. Each pane is associated with a particular view or feature (attachments, staging, etc) i.e. the view will change on each pane according to the title of the pane. The default view for the feature pages is Anterior.

Figure 3:
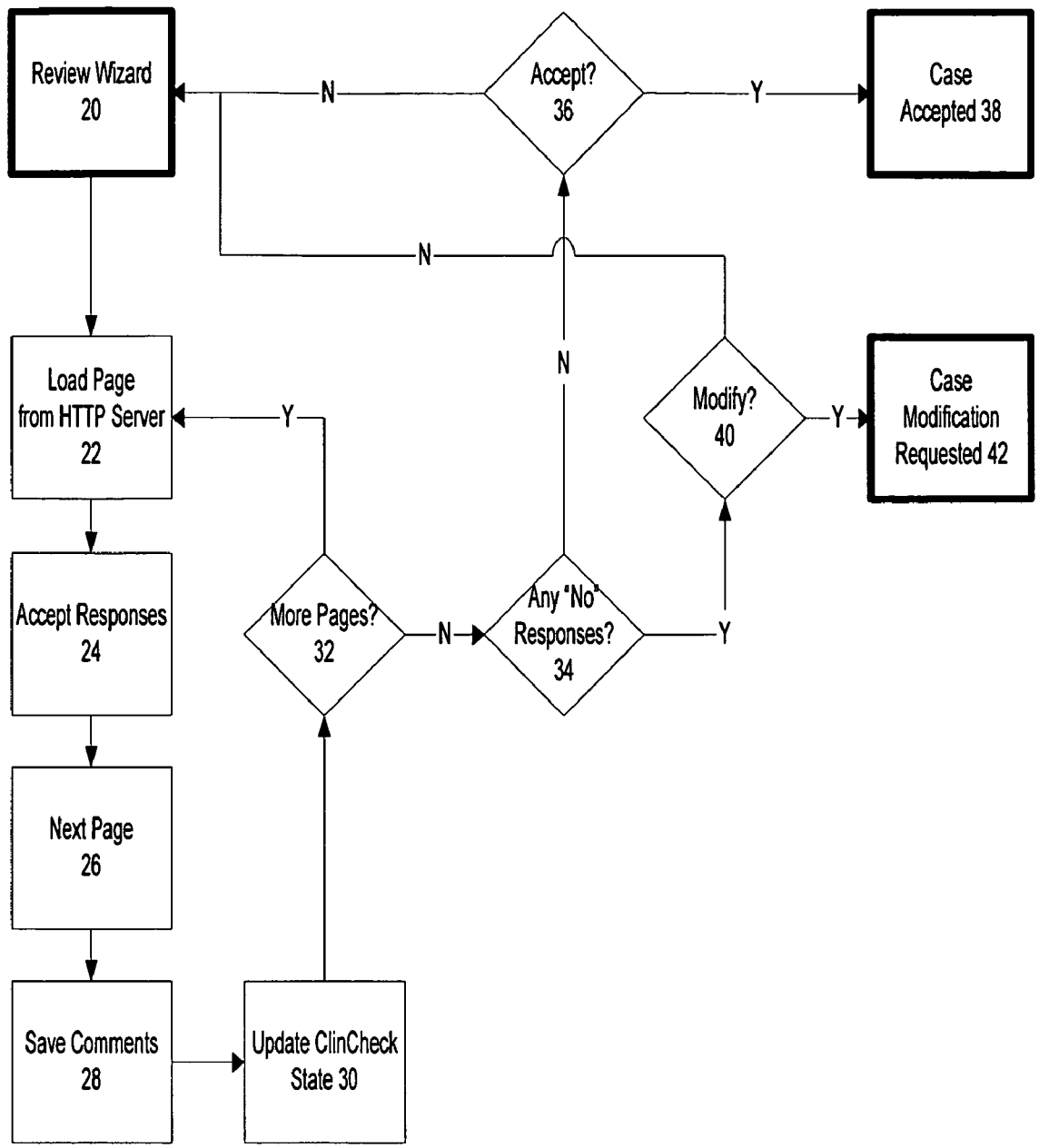
FIG. 3 shows an exemplary process for the user interface of FIG. 1B.
Figure 4:
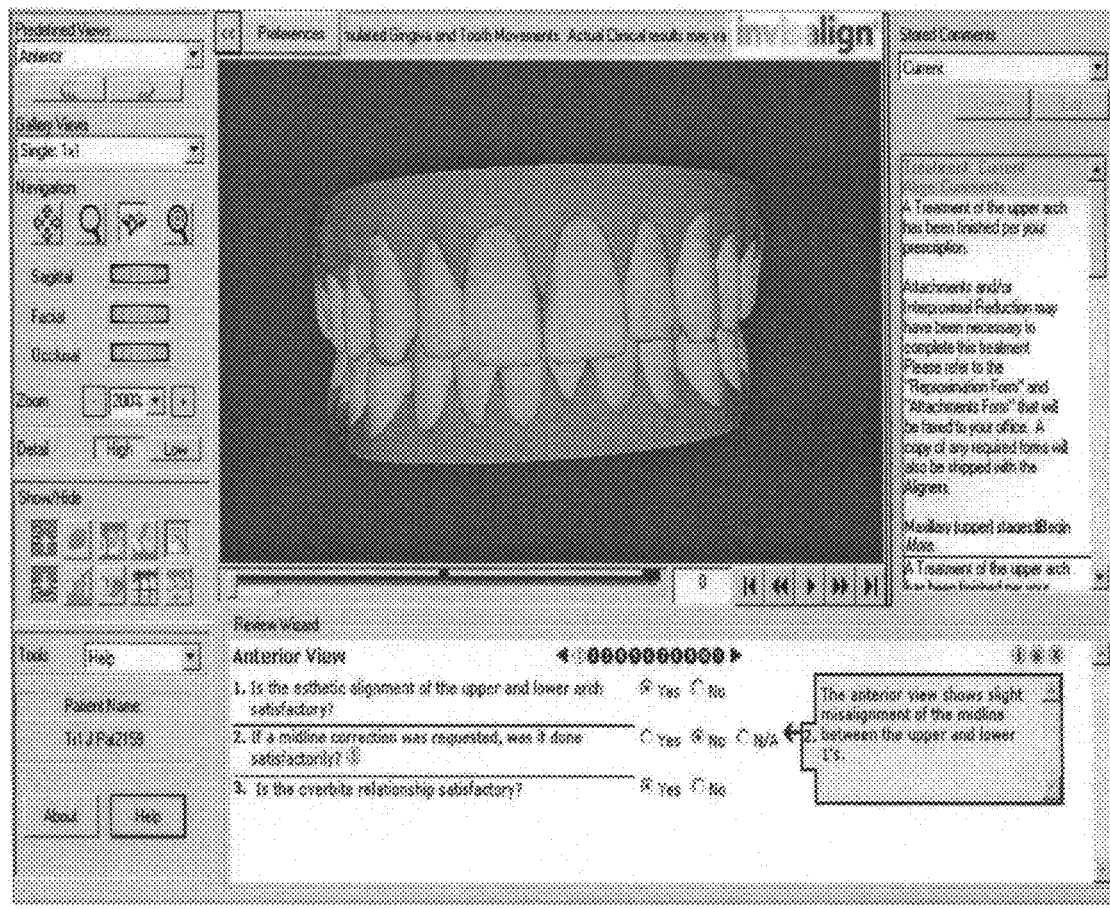
FIGS. 4-7 show various exemplary user interface panes that provide dynamic contents.

Referring now to FIG. 3, an exemplary process for capturing user acceptance of a proposed dental treatment is shown. First, the Review Wizard is initiated (20). Next, a Review Wizard page is loaded from a server (22). The responses to the Review Wizard page is received (24), and the next page is loaded and shown to the user to capture comments (26). The comments are saved (28), and the program state is updated (30). Next, the process of FIG. 3 determines whether additional pages remain to be reviewed (32). If so, the process loops back to 22 and other wise, the process checks whether "No" responses have been entered (34). If not, the process checks for acceptance (36). If accepted, the case acceptance is logged (38). Otherwise, the process loops back to 20 to continue case review. From 34, if the user has entered a "No" response, the process checks whether the user wishes to modify the case settings (40). If so, a case modification is requested (42) and if not, the process loops back to 20 to continue case review.

FIGS. 4-7 show various exemplary panes. Each pane will have a number of questions with Yes and No options. Some of the questions may also have a 'Not Available' (NA) option. If a doctor selects a No options, he will not be allowed to navigate away from the page unless he enters some comments. Each page will contain an info button to Clinical Communication Guideline which will appear on selecting any No option and will open a new window containing the guidelines. Some of the questions will have info buttons and help buttons associated with them which will either display message boxes or open new windows pointing to other documents.

Figure 5:
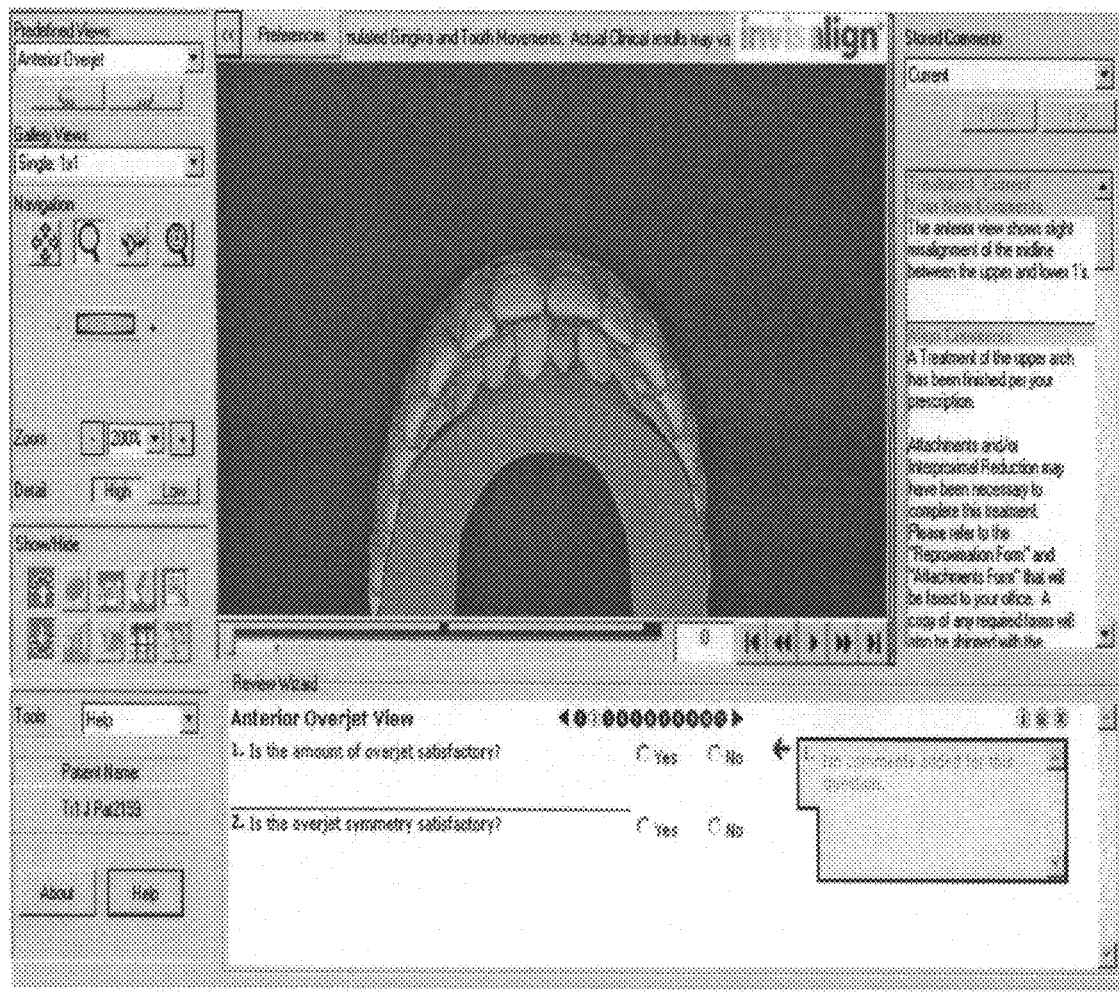
Figure 6:
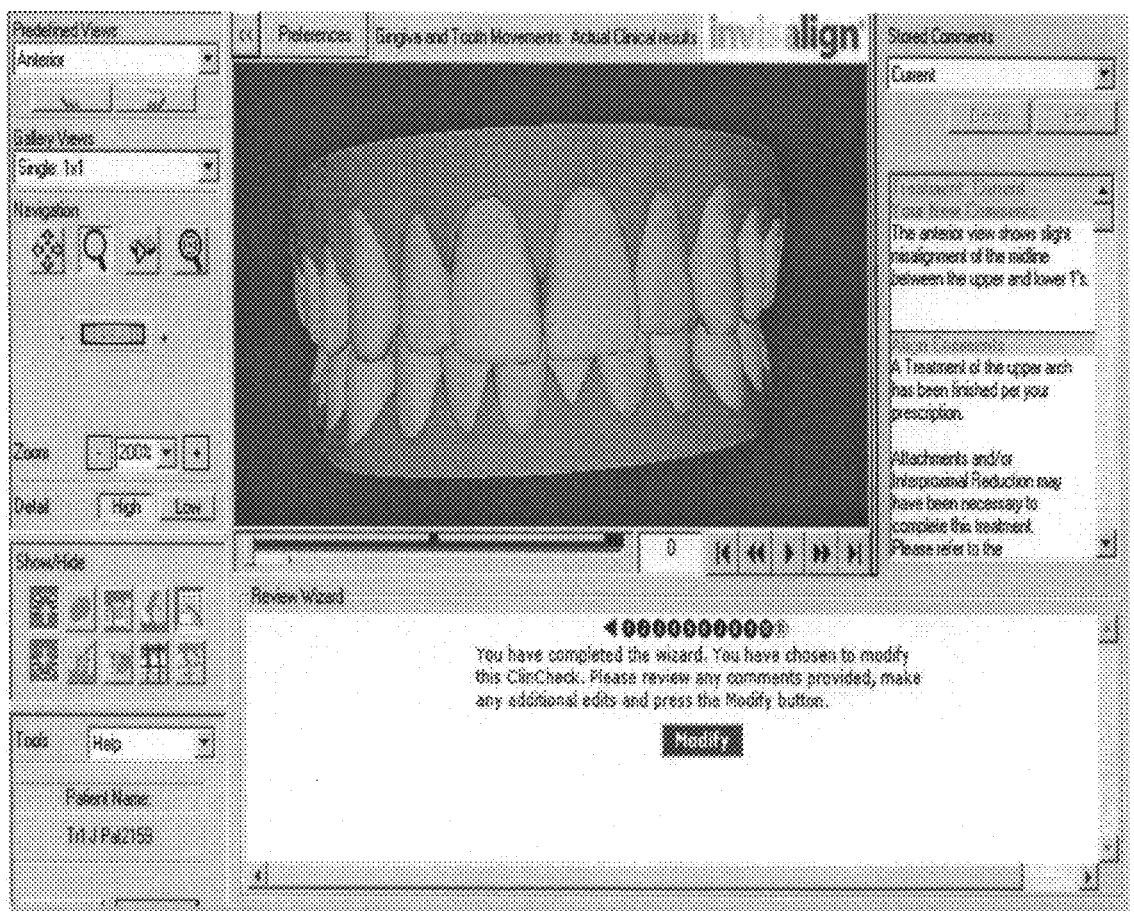
Figure 7:
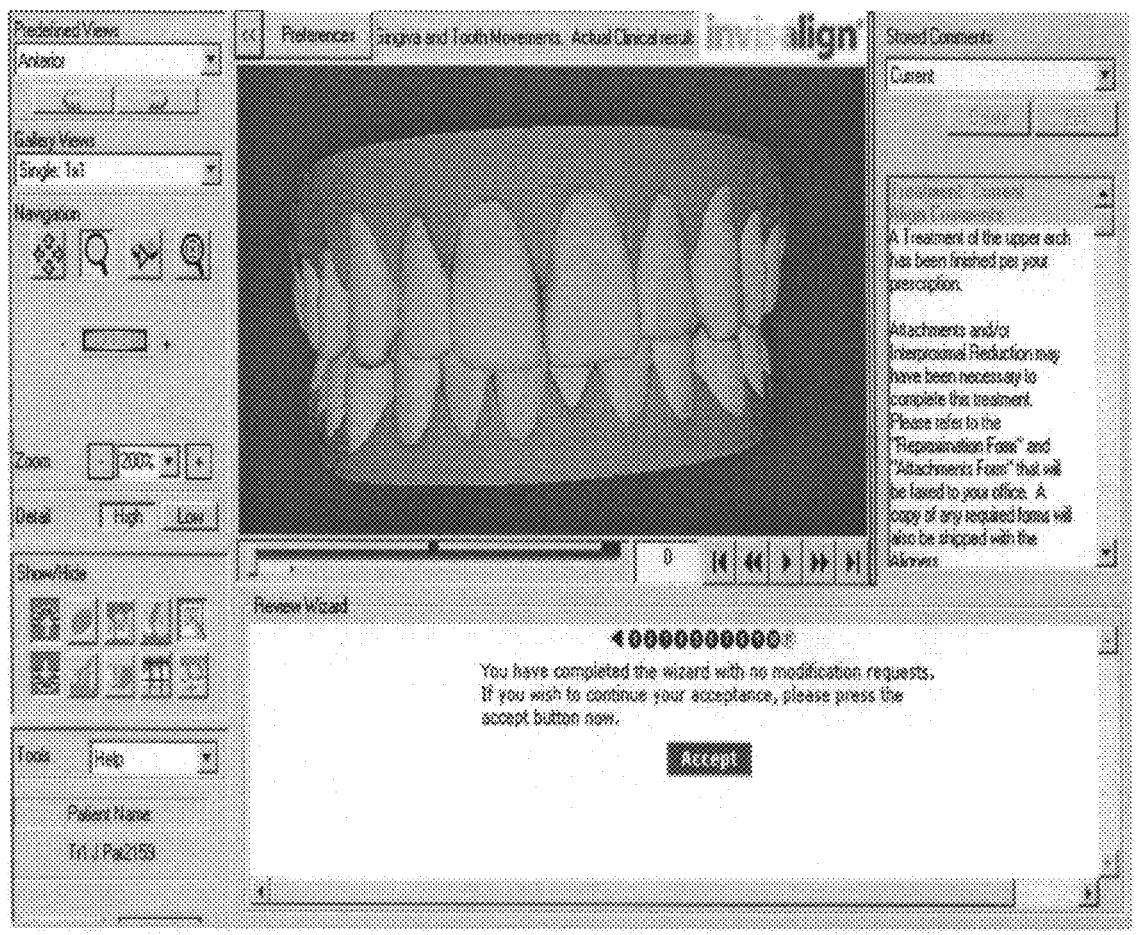

FIG. 5 shows an exemplary UI for a pane about the interior view. The HTML code for the pane is shown in APPENDIX B. The pane of FIG. 5 provides two exemplary commands to ClinCheck® program 2A in the form of an HTML comment as follows:

<!--ALIGNTECH:CameraViewpoint AnteriorOverjet:-->
<!--ALIGNTECH:RefreshComments all:-->

The HTML comment is ignored by the browser, but is processed and sent to ClinCheck® software when it is preceded by the ALIGNTECH: token. The commands CameraViewpoint AnteriorOverjet and RefreshComments are processed by ClinCheck to provide an anterior overjet view of the models of the teeth. Additionally, a series of questions are provided to the user in the Review Wizard region 6A.

Thus, the system provides a UI includes providing a program with a dynamic content to specify a view; and rendering the view based on the dynamic content. Moreover, the dynamic content also can be a web page to display information or collection information from the user. In this case, the information is collected from the user as to whether the overjet is satisfactory.

Comment processing is captured in an Accept/Reject Panel having three command buttons that allow the user to select Accept, Reject, or Review Wizard. One exemplary comment process is as follows:
1. A Case is submitted from a dental company to the Doctor.
   a. New cases will have comments from Dental company to the Doctor.
2. The Doctor will use the Accept/Reject Panel to choose Accept, Reject or Review Wizard
   a. Accepted cases will be submitted to Dental company with no additional comments
      i. The doctor will click the Accept Case button.
      ii. A message will appear saying the Case has been accepted
      iii. ClinCheck will close.
   b. A Rejected case will be submitted to Dental company with a set of New comments.
      i. The Doctor will click the Modify/Reject button
      ii. The Accept/Reject Panel will be replaced by a Modify Case Panel that will contain a comment entry text box and three buttons; Submit Comment, Confirm Modify, and Cancel.
      1. Clicking the Submit Comment will send the contents of the comment text box to the server. This will create a New Comment. It will also trigger a refresh of the Comment Grid control.
      2. Clicking the Confirm Modify button will send the contents of the text box to the server, trigger the ModifyCase web service to confirm, trigger a refresh of the Comment Grid control, and close the Modify Case Panel.
      3. Clicking the Cancel button deletes all New Comments, close the Modify Case Panel, restore the Accept/Reject panel, and trigger a refresh of the Comment Grid control.
   c. A Review Wizard case will be submitted to Dental company with a set of New Comments
      i. The Doctor will click the Review Wizard button
      ii. The Accept/Reject Panel will be replaced by the Review Wizard Panel (enhanced Browser control)
      iii. During the Review Wizard process, the doctor must navigate to all pages of the Review Wizard to complete all questions.
      iv. Each pane of the review wizard will have a single Comment entry text box. When the doctor navigates away from a Pane or clicks the Save Draft Comment button on the pane, the contents of the text box will be written to the server as a New Comment using the Web Service.
      v. On the final Pane of the Review Wizard, the doctor will be asked confirmation to Modify (Reject) Case if he has answered a No for at least one question. Otherwise, he will be asked for confirmation of Case Accept. The doctor can cancel the wizard at anytime by clicking on the close button.
      1. Clicking the Modify (Reject) Case button will trigger the CaseModify web service, close the Review Wizard Panel, and Close ClinCheck.
      2. Clicking the Accept Wizard button will trigger the CaseAccept web service, close the Review Wizard Panel, and Close ClinCheck.
      3. Reject and Review Wizard Cases are further processed:
   a. Once the case has been formally Rejected or Modified, the comments will become Permanent Comments.
   b. If the doctor's comments are not in English, they will automatically be submitted for translation (Translation Queue).
   c. The Rejected/Modified Case will be sent back to Clinical Operations team for processing.
   d. The translated comments will be available for the Clinical Operations team to review.
   e. Another ClinCheck with additional clinical comments will be created and sent to the doctor.

A simplified block diagram of a data processing system that may be used to develop orthodontic treatment plans is discussed next. The data processing system typically includes at least one processor which communicates with a number of peripheral devices via bus subsystem. These peripheral devices typically include a storage subsystem (memory subsystem and file storage subsystem), a set of user interface input and output devices, and an interface to outside networks, including the public switched telephone network. This interface is shown schematically as "Modems and Network Interface" block, and is coupled to corresponding interface devices in other data processing systems via communication network interface. Data processing system could be a terminal or a low-end personal computer or a high-end personal computer, workstation or mainframe.

The user interface input devices typically include a keyboard and may further include a pointing device and a scanner. The pointing device may be an indirect pointing device such as a mouse, trackball, touchpad, or graphics tablet, or a direct pointing device such as a touch-screen incorporated into the display, or a three dimensional pointing device, such as the gyroscopic pointing device described in U.S. Pat. No. 5,440,326, other types of user interface input devices, such as voice recognition systems, can also be used.

User interface output devices typically include a printer and a display subsystem, which includes a display controller and a display device coupled to the controller. The display device may be a cathode ray tube (CRT), a flat-panel device such as a liquid crystal display (LCD), or a projection device. The display subsystem may also provide non-visual display such as audio output.

Storage subsystem maintains the basic required programming and data constructs. The program modules discussed above are typically stored in storage subsystem. Storage subsystem typically comprises memory subsystem and file storage subsystem.

Memory subsystem typically includes a number of memories including a main random access memory (RAM) for storage of instructions and data during program execution and a read only memory (ROM) in which fixed instructions are stored. In the case of Macintosh-compatible personal computers the ROM would include portions of the operating system; in the case of IBM-compatible personal computers, this would include the BIOS (basic input/output system).

File storage subsystem provides persistent (non-volatile) storage for program and data files, and typically includes at least one hard disk drive and at least one floppy disk drive (with associated removable media). There may also be other devices such as a CD-ROM drive and optical drives (all with their associated removable media). Additionally, the system may include drives of the type with removable media cartridges. The removable media cartridges may, for example be hard disk cartridges, such as those marketed by Syquest and others, and flexible disk cartridges, such as those marketed by Iomega. One or more of the drives may be located at a remote location, such as in a server on a local area network or at a site on the Internet's World Wide Web.

In this context, the term "bus subsystem" is used generically so as to include any mechanism for letting the various components and subsystems communicate with each other as intended. With the exception of the input devices and the display, the other components need not be at the same physical location. Thus, for example, portions of the file storage system could be connected via various local-area or wide-area network media, including telephone lines. Similarly, the input devices and display need not be at the same location as the processor, although it is anticipated that personal computers and workstations typically will be used.

Bus subsystem is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The client computer may be a desktop system or a portable system.

Scanner is responsible for scanning casts of the patient's teeth obtained either from the patient or from an orthodontist and providing the scanned digital data set information to data processing system for further processing. In a distributed environment, scanner may be located at a remote location and communicate scanned digital data set information to data processing system via network interface.

Fabrication machine fabricates dental appliances based on intermediate and final data set information received from data processing system. In a distributed environment, fabrication machine may be located at a remote location and receive data set information from data processing system via network interface.

The invention has been described in terms of particular embodiments. Other embodiments are within the scope of the following claims.

APPENDIX A

AVAILABLE COMMANDS

| | |
|---|---|
| CameraPosition Fx Fy Fz Tx Ty Tz Ux Uy Uz: | This sets the camera's position, point that it's looking at, and which direction is up. |
| CameraViewpoint Name: | Change the camera position to a named viewpoint. Possible Views<br>1. RightBuccal<br>2. LeftBuccal<br>3. Anterior<br>4. Posterior<br>5. MandibularOcclusal<br>6. MaxillaryOcclusal<br>7. RightBuccalOverjet<br>8. AnteriorOverjet<br>9. LeftDistalMolar<br>10. LeftBuccalOverjet<br>11. LeftLingual<br>12. LingualIncisor<br>13. RightLingual<br>14. RightDistalMolar |
| Grid Visible on/off: | Turn the grid on or off. |
| GridPosition Px Py Pz Fx Fy Fz: | Move the grid to P(x, y, z), with the "flat" side facing F(x, y, z). |
| OverCorrectionVisible on/off: | Turn overcorrection stages on or off. |
| AttachmentsVisible on/off: | Turn attachments on or off. |
| IPRVisible on/off: | Turn on or off IPR information. |
| SetResolution high/low: | Set the display resolution to high or low. |
| JawUpperVisible on/off: | Turn on or off upper jaw visibility. |
| JawLowerVisible on/off: | Turn on or off lower jaw visibility. |

APPENDIX A-continued

| AVAILABLE COMMANDS | |
|---|---|
| ZoomLevel percent: | Set zoom level to percent %. |
| Stage stage: | Set the case's stage to stage. Stage can either be an integer, or the string "first", "last", or "lastnooc", which sets it to the first stage, the last stage, or the last stage without overcorrection. |
| StateChanged: | Is present if state has changed. State is a numerical value that is defined as 1. "Waiting for Doctor's Approval", 2. "Accepted", 3. "Modification in Progress", 4. "Modification Requested", and 5. "Review Wizard In Progress". |
| PrintScreen: | Brings up a print dialog that, when accepted, prints the 3D image displayed. |
| SaveScreen: | Brings up a save dialog that, when accepted, saves the 3D image as a JFIF (JPEG) file. |
| | Additional Commands |
| RefreshComments (all, new, old) | Trigger to tell the Comment Grid Control to retrieve comments from the server |
| ControlAttribute (controlid, attribute) | Pass a control attribute to a control in CC 2.0. (Used to disable or turn off buttons.) |
| CloseClinCheck( ) | Trigger to close ClinCheck. |

APPENDIX B

HTML FOR PANE 2 (FIG. 5)

```
<!--ALIGNTECH:CameraViewpoint AnteriorOverjet:-->

<!--ALIGNTECH:RefreshComments all:-->

<html>

<head>

<base href="http://betaweb/generalapp/us/en/ccwizard/ccWizardStep2.jsp">

<title>Comment Review Wizard</title>

<script language="javascript" src="include/script.js"></script>

<script language="JavaScript">

<!-- var currentTab=0;

var answer0 = -1;

var answer1 = -1;

function saveWizard(thisPage)
{
        error.innerText="";

if (!commentsAreComplete(3)) return false;

if (!commentsAreComplete(4)) return false;

updateStatus(3);

updateStatus(4);
```

```
document.forms("commentForm").nextPage.value = thisPage;

return true;
} function closeWizard()
{
    document.forms("commentForm").nextPage.value = "cancel";

return true;
} function updateAnswer0()
{
    switch(answer0) {
        case -1:

document.forms("commentForm").elements("wizardInfo.question[3].answer")[0].checked=false;

document.forms("commentForm").elements("wizardInfo.question[3].answer")[1].checked=false;
            break;
        case 0:

document.forms("commentForm").elements("wizardInfo.question[3].answer")[0].checked=true;

document.forms("commentForm").elements("wizardInfo.question[3].answer")[1].checked=false;
            break;
        case 1:

document.forms("commentForm").elements("wizardInfo.question[3].answer")[0].checked=false;
```

```
            document.forms("commentForm").elements("wizardInfo.question[3].answer")[1].checked=true;
                break;
    }

} function updateAnswer1()
{
        switch(answer1) {
            case -1:

document.forms("commentForm").elements("wizardInfo.question[4].answer")[0].checked=false;

document.forms("commentForm").elements("wizardInfo.question[4].answer")[1].checked=false;
                    break;
            case 0:

document.forms("commentForm").elements("wizardInfo.question[4].answer")[0].checked=true;

document.forms("commentForm").elements("wizardInfo.question[4].answer")[1].checked=false;
                    break;
            case 1:

document.forms("commentForm").elements("wizardInfo.question[4].answer")[0].checked=false;

document.forms("commentForm").elements("wizardInfo.question[4].answer")[1].checked=true;
                    break;
```

```
}

} function hideComments()

{
        hide('Comment0');

hide('Comment1');

hide('nocomments');

} function selectTab0()

{ if (!commentsAreComplete(4))

{
                updateAnswer0();

return false;

} hideComments();

show('arrow0');

hide('arrow1');

if (document.forms("commentForm").elements("wizardInfo.question[3].answer")[1].checked)

{
```

```
            tab0.className="selectedTab";

show('Comment0');

} else

{ tab0.className="selectedTabGray";

show('nocomments');

} if (document.forms("commentForm").elements("wizardInfo.question[4].answer")[1].checked)

tab1.className="unselectedLastTab";

else tab1.className="unselectedLastTabGray";

return true;

} function selectTab1()

{ if (!commentsAreComplete(3))

{ updateAnswer1();

return false;

} hideComments();
```

```
hide('arrow0');

show('arrow1');

if (document.forms("commentForm").elements("wizardInfo.question[3].answer")[1].checked)

tab0.className="unselectedTab";

else tab0.className="unselectedTabGray";

if (document.forms("commentForm").elements("wizardInfo.question[4].answer")[1].checked)

{ tab1.className="selectedLastTab";

show('Comment1');

} else

{ tab1.className="selectedLastTabGray";

show('nocomments');

} return true;

} function yes0()

{ if (!selectTab0()) return false;

hide('tip0');
```

```
        answer0=0;

return true;
} function no0()

{ if (!selectTab0()) return false;

document.forms("commentForm").elements("wizardInfo.question[3].answer")[1].checked=true;

show('tip0');

show('guidelines');

positionCaretAtEnd(document.forms("commentForm").elements("wizardInfo.question[3].comment"));

answer0=1;

return true;
} function yes1()

{ if (!selectTab1()) return false;

hide('tip1');

answer1=0;
} function no1()

{ if (!selectTab1()) return false;

document.forms("commentForm").elements("wizardInfo.question[4].answer")[1].checked=true;
```

```
        show('tip1');

show('guidelines');

positionCaretAtEnd(document.forms("commentForm").elements("wizardInfo.question[4].comme
nt"));

answer1=1;
} function init()
{
        if (document.forms("commentForm").elements("wizardInfo.question[4].answer")[1].checked)
                no1();
        if (document.forms("commentForm").elements("wizardInfo.question[3].answer")[1].checked)
                no0();
} function submitForm(nextPage)
{
        error.innerText="";

if (!commentsAreComplete(3)) return false;
        if (!commentsAreComplete(4)) return false;

if (!isAnswered('wizardInfo.question[3].answer'))
        {
                error.innerText="Please answer all questions.";
                return false;
```

```
            } if (!isAnswered('wizardInfo.question[4].answer'))
            {
                       error.innerText="Please answer all questions.";
                       return false;
            } document.forms("commentForm").nextPage.value = nextPage;
            return true;

}

//-->
</script>
</head>

<link rel="stylesheet" type="text/css" href="include/style.css" />
<body topmargin="0" leftmargin="0" onload="init();" bgcolor="white">

<form name="commentForm" method="post" action="/generalapp/us/en/ccwizard/step.do">
         <input type="hidden" name="nextPage" value="step2">
         <input type="hidden" name="wizardInfo.currentStep" value="2">
         <input type="hidden" name="wizardInfo.question[3].action" value="0">
         <input type="hidden" name="wizardInfo.question[4].action" value="0">

<table border="0" cellspacing="1" width="720" style="border-collapse: collapse" bordercolor="#111111">
```

```
                    <tr>
                        <td align="right">
                            <table border="0" cellpadding="0" cellspacing="0" width="100%">
                                <tr>
                                    <td width="33%"><b><font size="2">Anterior Overjet
View</font></b></td>
                                    <td width="34%" align="center"
valign="bottom"> <input type="image" src="images/prev.gif" title="Back" onclick="return
saveWizard('step1')" name="I1" />
                                        <input type="image" border="0" src="images/1-off.gif"
width="12" height="12" onClick="return submitForm('step1')"><img border="0" src="images/2-on.gif"
width="12" height="12"><img border="0" src="images/3-off.gif" width="12" height="12"><img
border="0" src="images/4-off.gif" width="12" height="12"><img border="0" src="images/5-off.gif"
width="12" height="12"><img border="0" src="images/6-off.gif" width="12" height="12"><img
border="0" src="images/7-off.gif" width="12" height="12"><img border="0" src="images/8-off.gif"
width="12" height="12"><img border="0" src="images/9-off.gif" width="12" height="12"><img
border="0" src="images/10-off.gif" width="12" height="12"><img border="0" src="images/11-off.gif"
width="12" height="12">
                                        <input type="image" src="images/next.gif" title="Next"
onclick="return submitForm('step3')" name="I2" /></td>
                                    <td width="33%" align="right">
                                        <a title="ClinCheck Communication Guidelines"
href="http://betaweb:80/vip/us/en/auth/patient/cc/clinCheckTips.jsp" target="_blank" id="guidelines">
                                            <img border="0" src="images/info.gif" width="12"
height="12"></a>
                                        <input type="image" title="Save" border="0"
src="images/save.gif" width="12" height="12" onclick="return saveWizard('step2');" />
```

```
                              <input type="image" title="Close" border="0"
src="images/close.gif" width="12" height="12" onclick="return closeWizard();" />
                            </td>
                          </tr>
                        </table>
                      </td>
                    </tr>
                    <tr>
                      <td>
                        <table border="0" cellspacing="0" cellpadding="0" width="100%">
                          <tr>
                            <td valign="top" colspan="2"><table width="100%"
border="0" cellspacing="0" cellpadding="0">
                                <tr><td colspan="2" bgcolor="white"><img
src="images/spacer.gif" width="1" height="1"></td></tr>
                                <tr>
                                  <td valign="top"><a
onClick="selectTab0();"><b>1. </b></a></td>
                                  <td valign="top" width="100%"><a
onClick="selectTab0();">Is the amount of overjet satisfactory?</a> <a id="tip0"
style="visibility:hidden;" href='javascript:alert("Check your prescription to see if you originally requested
the correction. If treating anterior teeth only, less overjet correction will be possible. Adding additional
IPR and/or AP changes to correct overjet can make a simple case more complex.");' title="Check your
prescription to see if you originally requested the correction. If treating anterior teeth only, less overjet
correction will be possible. Adding additional IPR and/or AP changes to correct overjet can make a simple
case more complex."><img border="0" src="images/tip.gif" width="12" height="12" /></a></td>
                                </tr>
                              </table>
```

```
            </td>
            <td valign="top">
                <input type="radio" name="wizardInfo.question[3].answer"
value="0" onclick="return yes0();">Yes</td>
            <td valign="top">
                <input type="radio" name="wizardInfo.question[3].answer"
value="1" onclick="return no0();">No 
            </td>
            <td> </td>
            <td valign="top"><a id="arrow0" style="visibility:visible;">
                <img border="0" src="images/arrow.gif"></a></td>
            <td valign="top" id="tab0" class="selectedTabGray"
align="center" onclick="selectTab0();">
                1. </td>
            <td valign="top" valign="top" rowspan="2"
class="commentrow" width="200">
                <textarea id="nocomments" class="textbox"
style="display:block" cols="32" rows="6" disabled>No comments added for this question.</textarea>
                <textarea name="wizardInfo.question[3].comment" cols="32"
rows="6" style="display:none" class="textbox" id="Comment0"></textarea>
                <textarea name="wizardInfo.question[4].comment" cols="32"
rows="6" style="display:none" class="textbox" id="Comment1"></textarea>
            </td>

</tr>
        <tr>
            <td valign="top" colspan="2"><table width="100%"
border="0" cellspacing="0" cellpadding="0">
```

```
                              <tr><td colspan="2" bgcolor="navy"><img
src="images/spacer.gif" width="1" height="1"></td></tr>
                              <tr>
                              <td valign="top"><a
onClick="selectTab1();"><b>2. </b></a></td>
                              <td valign="top" width="100%"><a
onClick="selectTab1();">Is the overjet symmetry satisfactory?</a> <a id="tip1"
style="visibility:hidden;" href='javascript:alert("Check to see if unitlateral IPR was done, unilateral IPR can
lead to asymmetry in the overjet.");' title="Check to see if unitlateral IPR was done, unilateral IPR can lead
to asymmetry in the overjet."><img border="0" src="images/tip.gif" width="12" height="12" /></a></td>
                              </tr>
                              </table>
                              </td>
                              <td valign="top">
                              <input type="radio" name="wizardInfo.question[4].answer"
value="0" onclick="return yes1();">Yes 
                              </td>
                              <td valign="top">
                              <input type="radio" name="wizardInfo.question[4].answer"
value="1" onclick="return no1();">No</td>
                              <td> </td>
                              <td valign="top"><a id="arrow1" style="visibility:hidden;">
                              <img border="0" src="images/arrow.gif"></a></td>
                              <td valign="top" id="tab1" class="unselectedLastTabGray"
align="center" onclick="selectTab1();">
                              2.</td>
                              </tr>
                              </table>
```

```
            </td>
        </tr>
        <tr>
            <td id="error" class="error" colspan="4" align="center"></td>
        </tr>
    </table>
</form>

<SCRIPT LANGUAGE="JavaScript">
<!--
    initComments[3] =
document.forms("commentForm").elements("wizardInfo.question[3].comment").value;
    initComments[4] =
document.forms("commentForm").elements("wizardInfo.question[4].comment").value;

//-->
</SCRIPT>
</body>

</html>
```

What is claimed is:

1. A method, comprising:
providing a user interface (UI) including a program to present a series of panes downloaded from a server, at least one of the panes programmed to display a view of an image of teeth, the image being one of a series of images showing positions of teeth at intermediate steps of a proposed orthodontic treatment plan, each intermediate step corresponding with one of a series of dental appliances, at least one of the panes providing at least one tool to change the view, and at least one of the panes providing a number of questions eliciting user satisfaction with the proposed orthodontic treatment plan based on observations of the images;
receiving responses to the number of questions via the UI;
capturing comments via the UI when the user indicates dissatisfaction in response to one or more of the number of questions, wherein capturing comments includes prompting the user to enter text that includes reasons for the dissatisfaction indicated by the user without including a proposed update to the orthodontic treatment plan;
submitting the comments to a dental company in response to the user indicating dissatisfaction with an aspect of the proposed orthodontic treatment plan;
updating proposed orthodontic treatment plan settings and the view based on the responses and the comments, wherein updating is performed by the dental company; and
submitting the updated proposed orthodontic treatment plan to the dental company for manufacturing the series of dental appliances in response to the user indicating satisfaction with every aspect of the proposed orthodontic treatment plan.

2. The method of claim 1, wherein the program includes an animation routine that can step through the series of images showing the positions of the teeth at the intermediate steps of the proposed orthodontic treatment plan.

3. The method of claim 2, wherein the series of images include an initial image of the teeth prior to the proposed orthodontic treatment plan, and a final image of the teeth after completion of the proposed orthodontic treatment plan.

4. The method of claim 3, wherein the animation routine derives transformation curves to determine the image at a particular intermediate step by invoking a path-generation program.

5. The method of claim 1, wherein the method includes checking whether the user wishes to modify the proposed orthodontic treatment plan settings in response to the user indicating dissatisfaction in response to the one or more of the number of questions.

6. The method of claim 1, wherein navigation away from a page is prohibited after being prompted until text is entered.

7. The method of claim 1, wherein:
the number of questions are provided by a program with a dynamic content encoded as HTML, and updating the view is controlled by one or more commands each encapsulated in a comment.

8. The method of claim 1, wherein the image of teeth is a 3D model.

9. The method of claim 1, wherein the program provides a dynamic content region to specify one or more view characteristics.

10. The method of claim 9, wherein the view characteristics comprise one or more of the following: camera position, camera named view point, grid enable, grid position, resolution, zoom level, and timebase.

11. The method of claim 9, wherein the view characteristics comprise one or more of the following: tooth overcorrection, dental attachment, interproximal reduction, jaw.

12. The method of claim 6, wherein navigation to a next page of questions is prohibited unless a response is received to every question on a present page, navigation to a next page updating a server with responses to the questions on the present page.

13. A data processing system, comprising:
means for providing a user interface (UI) for obtaining approval to manufacture a series of dental appliances, including a program to present a series of panes downloaded from a server, at least one of the panes programmed to display a view of an image of teeth, the image being one of a series of images showing positions of teeth at intermediate steps of a proposed orthodontic treatment plan, each intermediate step corresponding with one of the series of dental appliances, at least one of the panes providing at least one tool to change the view, and at least one of the panes providing a number of questions eliciting user satisfaction with the proposed orthodontic treatment plan based on observations of the images; and
means for receiving responses to the number of questions via the UI;
means for obtaining feedback on the proposed orthodontic treatment plan including means for prompting the user to enter text in response to the user indicating dissatisfaction in response to one or more of the number of questions, wherein the text includes reasons for the dissatisfaction indicated by the user without including a proposed update to the orthodontic treatment plan;
means for updating proposed orthodontic treatment plan settings and the view based on the feedback, wherein updating is performed by the dental company; and
means for submitting the updated proposed orthodontic treatment plan to the dental company for manufacturing the series of dental appliances in response to feedback indicating user satisfaction with every aspect of the proposed orthodontic treatment plan.

14. A data processing system, comprising:
a user interface (UI) for obtaining approval to manufacture a series of dental appliances;
a server in communication with the UI, the server including:
a processor;
a memory coupled to the processor; and
program instructions provided to the memory and executable by the processor to:
present, at the UI, a series of panes downloaded from the server, at least one of the panes programmed to display a view of an image of teeth, the image being one of a series of images showing positions of teeth at intermediate steps of a proposed orthodontic treatment plan, each intermediate step corresponding with one of the series of dental appliances, at least one of the panes providing at least one tool to change the view, and at least one of the panes providing a number of questions eliciting user satisfaction with the proposed orthodontic treatment plan based on observations of the images;
receive responses to the number of questions via the UI;
capture comments via the UI when the user indicates dissatisfaction in response to one or more of the number of questions, including prompting the user to enter text that includes reasons for the dissatisfaction indicated by the user without including a proposed update to the orthodontic treatment plan;

submit the comments to a dental company in response to the user indicating dissatisfaction with an aspect of the proposed orthodontic treatment plan;

update proposed orthodontic treatment plan settings and the view based on the responses and the comments, wherein updating is performed by the dental company; and submit the updated proposed orthodontic treatment plan to the dental company for manufacturing the series of dental appliances in response to the user indicating satisfaction with every aspect of the proposed orthodontic treatment plan.

15. The system of claim 14, wherein the program instructions include an animation routine to step through the series of images showing the positions of the teeth at intermediate steps of the proposed orthodontic treatment plan.

16. The system of claim 13, wherein the series of images include an initial image of the teeth prior to the proposed orthodontic treatment plan, and a final image of the teeth after completion of the proposed orthodontic treatment plan.

17. The method of claim 1, wherein the response to some of the number of questions must be a yes or no.

18. The method of claim 1, wherein the response to some of the number of questions may be that the question is not applicable.

19. The method of claim 1, wherein responses are communicated back to a server.

20. The method of claim 1, wherein the dental company is a dental appliance fabrication company.

21. A method to provide a user interface (UI) for obtaining approval to manufacture a series of tooth-moving appliances, comprising:

providing a program with a dynamic content to specify an orthodontic view of an animated series of images showing positions of teeth at intermediate steps of a proposed orthodontic treatment plan, each intermediate step corresponding with one of the series of tooth-moving appliances, the program serving to present a number of panes downloaded from a server; and rendering the orthodontic view based on the dynamic content, the dynamic content configured to ascertain acceptance of the proposed orthodontic treatment plan;

wherein at least one of the panes comprises at least one tool to change the orthodontic view and at least one of the panes provides a proposed orthodontic treatment plan review, the proposed orthodontic treatment plan review including putting forth a number of proposed orthodontic treatment plan aspects for consideration by a user based on observations of the animated series of images and prompting the user to indicate satisfaction with each aspect of the proposed orthodontic treatment plan prior to approval to manufacture the series of the tooth-moving appliances that implement the proposed orthodontic treatment plan;

wherein the user is prompted, in response to indicating dissatisfaction with an aspect of the proposed orthodontic treatment plan, to provide comments via the UI including reasons for the dissatisfaction without including a proposed update to the orthodontic treatment plan and the user is not allowed to navigate away from a page after being prompted to provide comments.

* * * * *